(12) United States Patent
Li et al.

(10) Patent No.: US 7,672,116 B2
(45) Date of Patent: Mar. 2, 2010

(54) FAST TERMINAL BOX

(75) Inventors: Guoqing Li, Cixi (CN); Yueming Lin, Cixi (CN)

(73) Assignee: Renhe Photovoltaic Technology Co., Ltd., Ningbo (CN)

( * ) Notice: Subject to any disclaimer, the term of this patent is extended or adjusted under 35 U.S.C. 154(b) by 0 days.

(21) Appl. No.: 12/042,304

(22) Filed: Mar. 4, 2008

(65) Prior Publication Data

US 2008/0232040 A1 Sep. 25, 2008

(30) Foreign Application Priority Data

Mar. 23, 2007 (CN) .................... 2007 1 0067745

(51) Int. Cl.
*H02B 1/26* (2006.01)
*H05K 7/20* (2006.01)
*H01R 12/00* (2006.01)

(52) U.S. Cl. .................... 361/641; 361/704; 361/710; 361/715; 439/76.2

(58) Field of Classification Search ................. 361/641; 439/76.2
See application file for complete search history.

(56) References Cited

U.S. PATENT DOCUMENTS

| 6,655,987 | B2 * | 12/2003 | Higashikozono et al. .... 439/535 |
| 7,154,753 | B2 * | 12/2006 | Kobayashi ................... 361/715 |
| 7,365,965 | B2 * | 4/2008 | Higashikozono et al. .... 361/641 |
| 7,369,398 | B2 * | 5/2008 | Higashikozono et al. .... 361/641 |
| 2008/0190477 | A1 * | 8/2008 | Hattori ....................... 136/246 |

* cited by examiner

*Primary Examiner*—Gregory D Thompson
(74) *Attorney, Agent, or Firm*—George G. Wang; Bei & Ocean (57) ABSTRACT

A fast terminal box includes a casing, a cover, plural wiring sockets, plural metal connection components and a plurality of wiring terminals. The wiring sockets are placed and distributed on a bottom plate of the casing one by one. The metal connection component is provided on the wiring socket for connection purpose. The casing and the cover are combined to each other. The wiring terminals are distributed at sidewall of the casing for receiving corresponding wiring plugs therein. The fast terminal box is characterized in heat sink metal fins are contained in a space around the wiring socket, and heat sink metal fins contact pins of a diode and the metal connection component respectively through corresponding connection portions thereof. Wiring apertures are defined in an outer surface of the heat sink metal fins, thereby improving heat dissipating effect and especially by utilization of heat sink metal fins of covering construction, heat dissipation effect being more effectively improved, and also the heat sink metal fins capable of being mounted conveniently and quickly.

16 Claims, 8 Drawing Sheets

FAST TERMINAL BOX

FIELD OF THE INVENTION

The invention relates to a terminal box used in electrical components and, more particularly relates to a fast terminal box featured in quick connection and suited to quick connection/disconnection of power lines and other conductive lines of solar cell components.

BACKGROUND OF THE INVENTION

As a result of shortage of energy, solar cells have been known and utilized more commonly and accordingly, fast terminal boxes associated closely with applications of the cells have also been developed. Upon these terminal boxes, many improvements have been made by engineers.

For example, a fast terminal box comprising a casing and a wiring socket contained therein; plural conductive tabs received in the wiring socket; plural wiring terminals connected with the conductive tabs and springs for clamping the wiring terminals is disclosed in China Patent CN03232075.2. The fast terminal box is characterized in a) said casing is constructed of engineer plastic and has two parallel fixed rails positioned on its bottom; b) at least two parallel wiring sockets are formed on the fixed rails respectively, each sockets having a sliding groove at left and right sides thereof for sliding along a respective fixed rail, and each socket having resilient snap hooks on both sides thereof for connecting with the fixed rails; c) at least two wiring terminals coupled to a dismountable wiring plug component are secured at one side of the casing; d) the wiring sockets each are made of engineer plastic and constructed from a left half portion and a right half portion by fastening them together via insertion of an integral pin shaft into a corresponding pin hole; e) an embedding slot is defined in the socket formed of two halves of the wiring socket with an electrically conductive tab securely embedded therein; f) a cover is disposed on and connected to the casing through insertion or screws for hermetically engaging with one end of the casing. One advantage of this terminal box lies in that suitable number of wiring sockets may be combined together according to desire and snap-fitted to the rails for use. This construction however, is complex due to large quantity of parts and high costs.

For overcoming the abovementioned drawbacks, a fast terminal box which is simple in configuration and convenient to be used is designed. For example, such a fast terminal box is disclosed in patent application No. 200520117035X, which includes a casing, a cover, a wiring socket, a plurality of electrically conductive tabs and several wiring terminals. The plural wiring sockets are located at the bottom of the casing in such a manner that these sockets are parallel to each other, and at least two wiring terminals are located laterally on the casing so as to engage the wiring sockets respectively. Each wiring terminal is coupled to a dismountable wiring plug component. Each wiring socket is formed by combing an upper socket body and a lower socket body together via snap-fitting between several integrally formed snap pins and corresponding snap holes. An embedding slot is defined in the lower socket body of the wiring socket, and an electrically conductive tab is firmly embedded into the slot. The electrically conductive tab has two inserting holes formed at its center portion with a snap pin formed on a bottom surface of each insertion hole. Accordingly, a metal inserting member with two resilient snap pins and two inserting holes defined therein is received in the inserting hole of the electrically conductive tab. The fast terminal box is characterized in the lower socket body is directly secured at the bottom surface of the casing, and a snap opening is defined at each lateral surface of the inserting member for securing pins of a diode therein. The fast terminal box is advantageous due to its simple construction, easy manufacture, low cost and convenient utilization.

In summary, conventional terminal boxes suffer from several drawbacks, since they fail to sufficiently consider heat generated during electrical conduction of both the metal connection member and diode. Especially, with increasing of work current in solar cell devices, this kind of heat generation is more significant, which in turn would affect normal operation of the terminal boxes.

SUMMARY OF THE INVENTION

The problems to be solved by the instant invention is to provide a fast terminal box, which benefits from simple and suitable structure and effective heat dissipation as well, compared to conventional technique.

The technical solution employed by the invention to eliminate the above problems comprises a fast terminal box, including a casing, a cover, plural wiring sockets, plural metal connection components and a plurality of wiring terminals. The wiring sockets are placed and distributed on a bottom plate of the casing one by one. The metal connection component is provided on the wiring socket for connection purpose. The casing and the cover are combined to each other. The wiring terminals are distributed at a sidewall of the casing for receiving corresponding wiring plugs therein. The fast terminal box is characterized in heat sink metal fins are contained in a space around the wiring socket, while heat sink metal fins contact pins of a diode and the metal connection component respectively through corresponding connection portions thereof. Wiring apertures are defined in an outer surface of the heat sink metal fins.

As an improvement, the heat sink metal fins take the form of covering structure, in which the cross section of a main body is shown as an inverted "Ц". A first connection tab for contacting the pins of the diode and second connection tab for contacting the metal connection component are formed at the sidewalls of the heat sink metal fins at the central portion thereof by stamping process. Alternatively, the heat sink metal fins take the form of a covering structure, in which the cross section of a main body is shown as an inverted "Ц", and snap holes for contacting pins of the diode are defined in sidewalls of the heat sink metal fins at the central portion thereof by stamping process, thereby largely increasing heat dissipative surface and therefore facilitating heat dissipation.

As a further improvement, resilient snap pins are positioned at two sides of the wiring socket and accordingly, snap openings are defined at sidewalls of the heat sink metal fins. The heat sink metal fins are mounted around the wiring socket via snap-fitting engagement, whereby assisting in assembling process.

As a more advantageous improvement, the metal connection component includes an electrically conductive tab embedded into the wiring socket. In addition, multiple rows of dual columns of inserting holes are defined at central portion of the electrically conductive tab provided on the central wiring socket for receiving the pins of a diode, and a single row of dual columns of inserting holes are defined at central portion of the electrically conductive tab provided on two laterally located wiring sockets for receiving the pins of a diode. Several diodes are received between adjacent electrically conductive tabs of the wiring socket in parallel. Correspondingly, a number of first connection tabs or snap holes are formed in sidewalls of the electrically conductive tab at central portion thereof by stamping process for contacting pins of a diode. By using parallel circuit, resistance is greatly reduced, thereby dramatically increasing capability of current flowing there through, and thus reducing heat generation.

As a more advantageous improvement, the metal connection component includes an electrically conductive tab embedded into the wiring socket. In addition, multiple rows of dual columns of inserting holes are defined at central portion of the electrically conductive tab provided on a wiring socket for receiving the pins of a diode. Several diodes are received between adjacent electrically conductive tabs of the wiring socket in parallel. Correspondingly, a number of first connection tabs or snap holes are formed in sidewalls of the electrically conductive tab at central portion thereof by stamping process for contacting pins of a diode, hence reducing heat generation.

Preferably, the first connection tabs each are arc-shaped for easy location and assembly of pins of a diode.

Preferably, the receiving holes of the electrically conductive tabs take the form of double rows and dual columns for receiving pins of a diode therein, thus helping in actual fabrication and utilization.

Preferably, in addition to electrically conductive tabs, the metal connection component further comprises a resilient metal tab and a metal snap tab. Back portion of the electrically conductive tab has a Ц-shaped cross section, an inwardly recessed portion of which are fixedly connected with a resilient tab of σ-shape. A vertical side of the resilient tab is pressed against an Ц-shaped inner surface of the electrically conductive tab. A rectangular hole is defined at a free end of the resilient tab that extends from the resilient tab. The front end of the rectangular hole is snapped and fastened to the outer vertical side of the Ц-shaped electrically conductive tab, while the back end of the electrically conductive tab is embedded into the embedding slot of the wiring socket. A resilient pressing tab is supported between the inner wall of the wiring socket and the electrically conductive tab. The electrically conductive tab has a rectangular inserting hole defined at its central portion. Inserting pins are disposed at both sides of the inserting hole for inserting into the mounting holes of the wiring socket. A rectangular inserting hole and a resilient snap pin are formed on an engagement tab having a snap side. The resilient snap pin engages the inserting pin of the electrically conductive tab in order to secure the pins of a diode already connected. The electrically conductive tab has a resilient inserting opening formed on its front portion for receiving and connecting an inserting head of a plug component. The front end of the electrically conductive tab has a metal socket press-fitted thereto, and a through hole is provided in the metal socket for insertion of the inserting head of the plug component. A press-fitting screw is connected to the metal socket at the top portion thereof. The metal socket is embedded and secured in a receiving hole of the wiring socket for realizing fast and readily wiring.

As a further improvement, the pins of the diode and the first connection tabs are connected with each other via welding, thereby improving heat transferring performance and resulting in more reliable connection.

A more advantageous improvement involves the casing has a snap tab disposed at its side surface adjacent the wiring terminal. A snap pin is provided on the snap tab and accordingly, snap teeth engaging the snap pin are formed around the perimeter of a nut surface of the wiring terminal such that the nut will not be loosed.

Finally, pairs of snap tabs are disposed at both sides of the wiring terminal.

Compared to conventional technique, the present invention is advantageous since heat sink metal fins are employed to improve heat dissipation performance. More particularly, utilization of cover-structural heat sink metal fins further improves heat dissipation effect. In addition, the heat sink metal fins can be assembled quickly and conveniently. Utilization of a circuit in which diodes are in parallel respect to each other greatly enhances capability of current flowing and reduces heat generation. This enables the terminal box to be suited to environment where currents of large amplitude are used. Moreover, the fast terminal box of the invention is simple in construction, readily to be made, convenient to be used and bears low cost.

DETAILED DESCRIPTION OF THE INVENTION

The invention will now be described in more detail in conjunction with the accompanying drawings and embodiments.

EMBODIMENT 1

Figure 1:
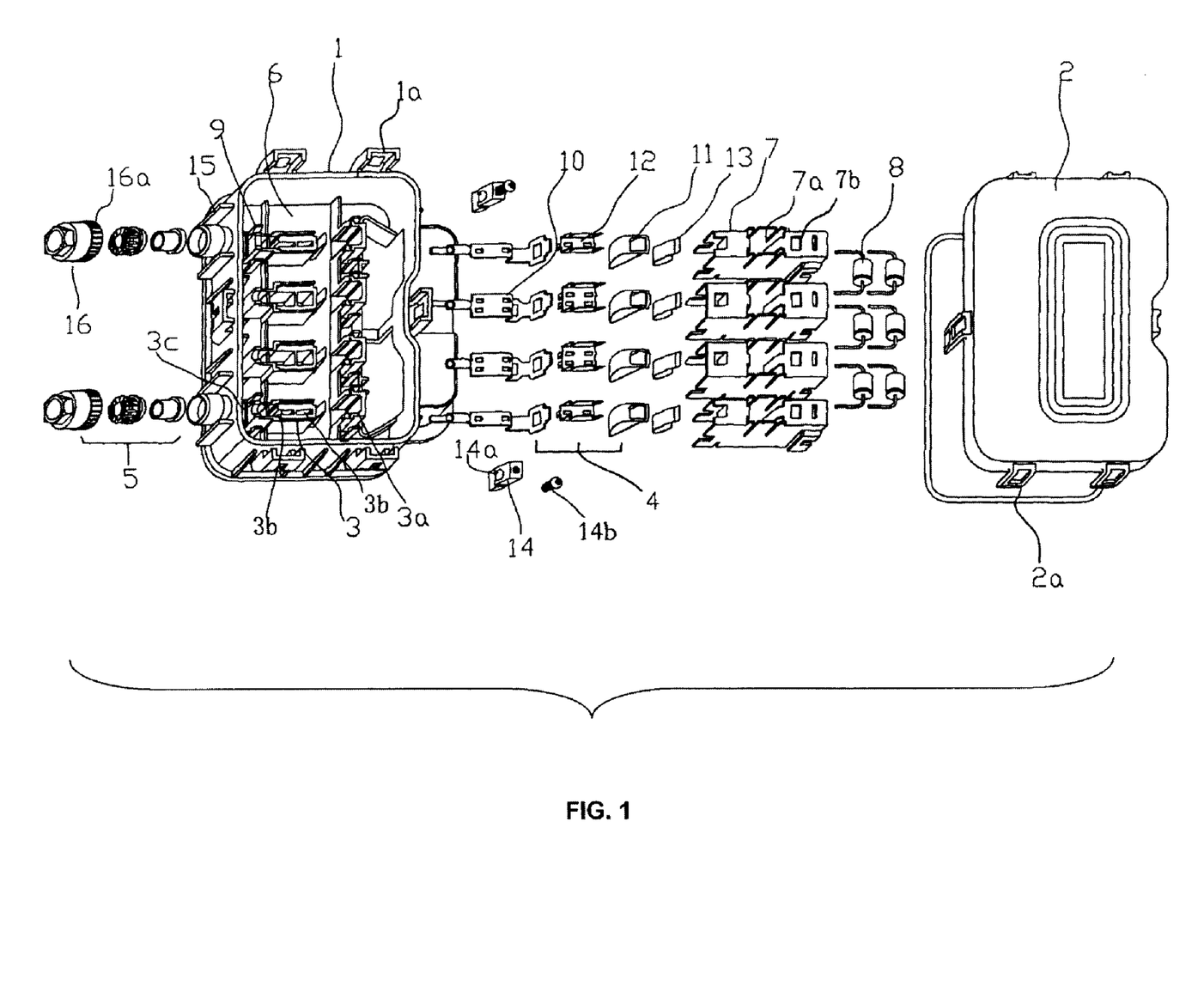
FIG. 1 is an exploded perspective view of a fast terminal box.
Figure 2:
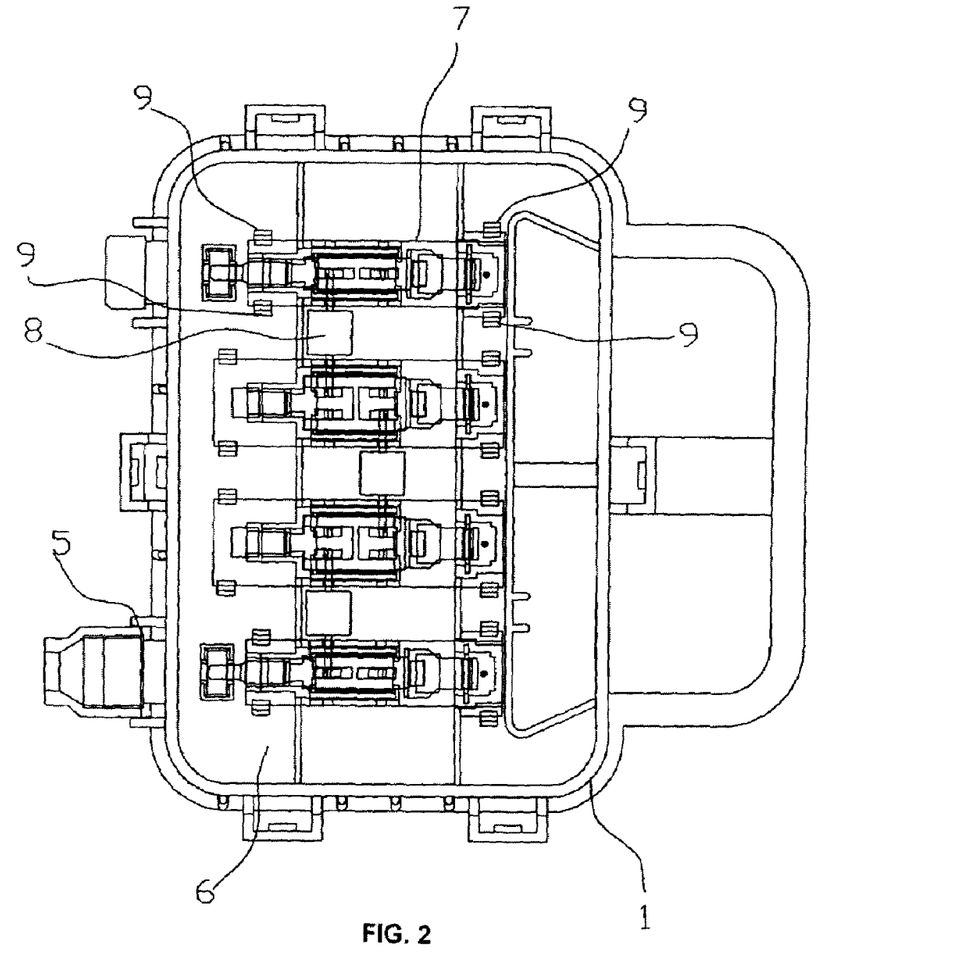
FIG. 2 is a top plan view of the fast terminal box (in perspective)
Figure 3:
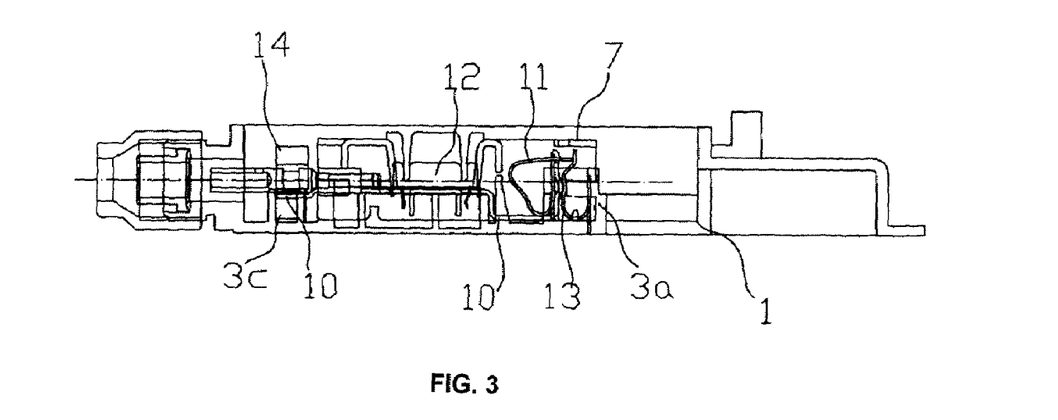
FIG. 3 is a side view of the fast terminal box (in perspective)
Figure 5A:
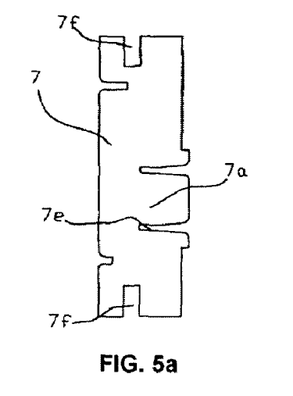
FIG. 5a is a side view of a heat sink metal fin.
Figure 5B:
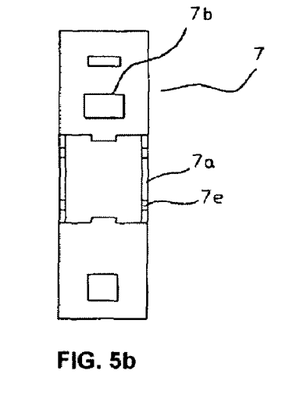
FIG. 5b is a top plan view of the heat sink metal fin.

As shown in FIGS. 1-3, a fast terminal box mainly comprises a casing 1, a cover 2, plural wiring sockets 3, plural metal connection components 4 and a plurality of wiring terminals 5. A plurality of wiring sockets 3 is placed and distributed on a bottom plate 6 of the casing lone by one. The metal connection component 4 is provided on the wiring socket 3 for connection purpose. The casing 1 and the cover 2 are combined to each other. The wiring terminals 5 are distributed at sidewall of the casing 1 for receiving corresponding wiring plugs therein. All these constructions are of conventional technology and therefore, detailed description thereof will be omitted here from. A critical feature of the invention is: plural heat sink metal fins 7 made of copper or aluminum are contained in a space around the wiring socket 3. Wiring apertures 7b and inserting holes for insertion of a tool therein are defined in a surface of the heat sink metal fins 7 respectively. The heat sink metal fins 7 take the form of covering structure, in which the cross section of a main body is shown as an inverted "Ц". As illustrated in FIG. 5a and FIG. 5b, a snap hole 7e for contacting pins os a diode 8 is defined in sidewalls 7a of the heat sink metal fins 7 at the central portion thereof by stamping process. Snap openings 7f are defined at four corners of a sidewall of the heat sink metal fin 7. Correspondingly, resilient snap pins 9 are disposed at four corners of the both sides of a sidewall of the wiring socket 3 such that the heat sink metal fin 7 is mounted around the wiring socket 3 by snap-fitting engagement.

Figure 6:
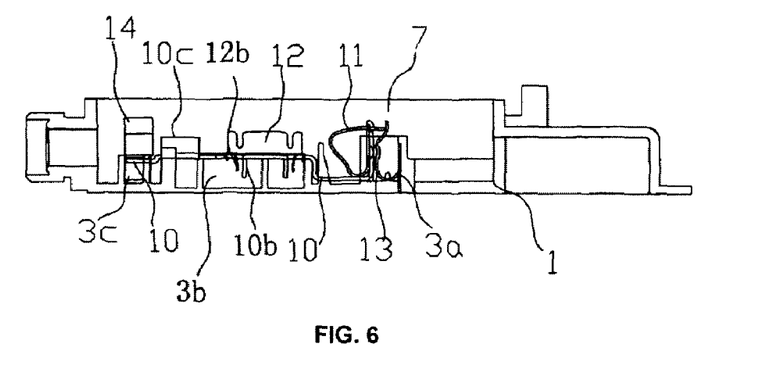
FIG. 6 is a side view of the fast terminal box (with the heat sink metal fin and a plug component removed)
Figure 7:
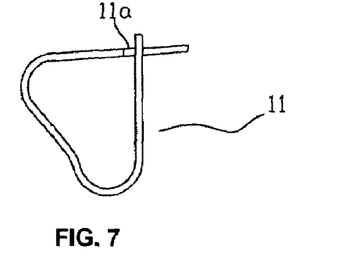
FIG. 7 shows structure of a resilient tab.
Figure 8:
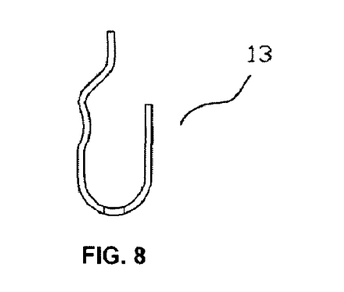
FIG. 8 shows structure of a pressing member.
Figure 9A:
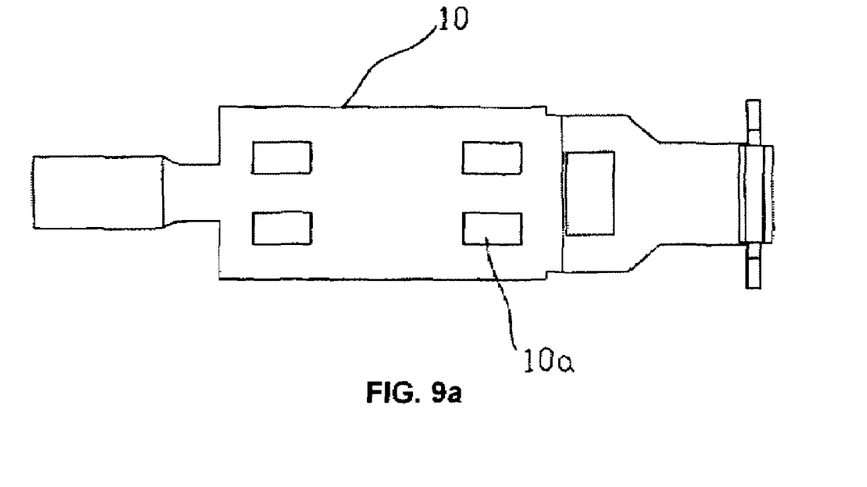
FIG. 9a is a top plan view of an electrically conductive tab.
Figure 9B:
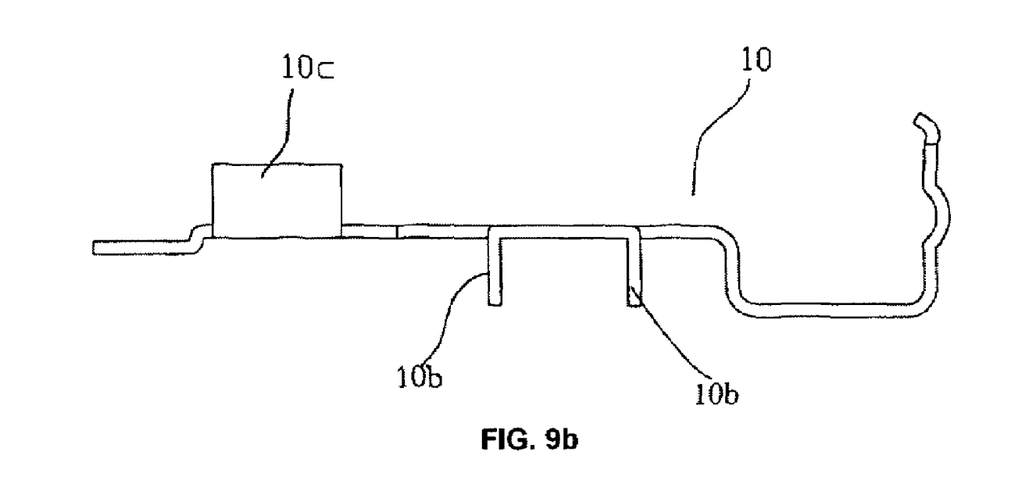
FIG. 9b is a side view of the electrically conductive tab.
Figure 10A:
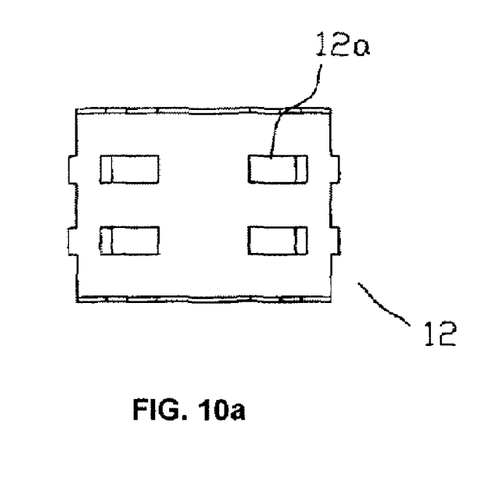
FIG. 10a is a top plan view of a metal snap tab.
Figure 10B:
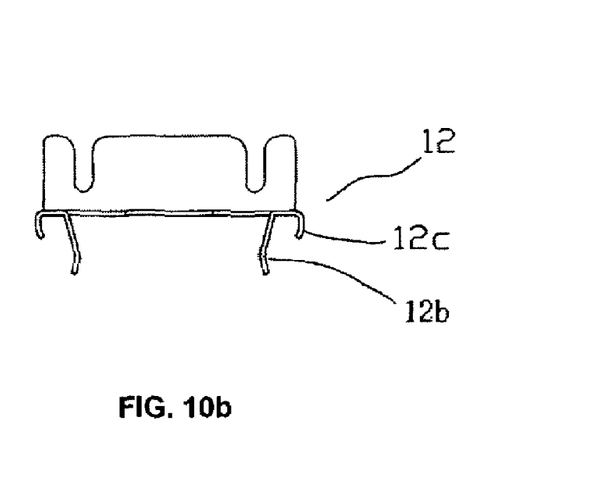
FIG. 10b is a side view of the metal snap tab.
Figure 11:
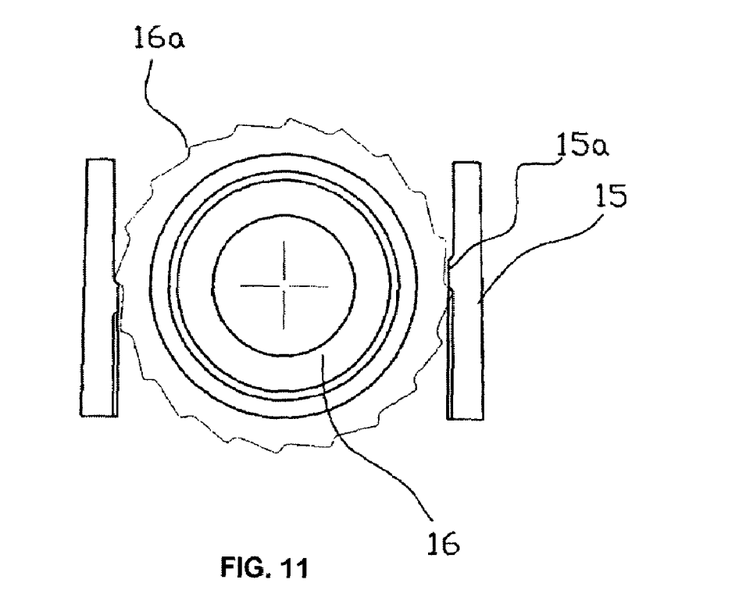
FIG. 11 shows structure of a nut and snap tab.

As a further improvement, as seen in FIGS. 1, 3 and 6, in embodiments of the invention, in addition to electrically conductive tabs 10, the metal connection component 4 further comprises a resilient metal tab 11 and a metal snap tab 12. Back portion of the electrically conductive tab 10 has a Ц-shaped cross section, an inwardly recessed portion of which is connected fixedly with a substantially σ-shaped resilient tab 11. A vertical side of the resilient tab 11 is pressed against a Ц-shaped inner surface of the electrically conductive tab 10. A rectangular hole 11a is defined at a free end of the resilient tab 11 that extends from the resilient tab 11. The front end of the rectangular hole 11a is snapped and fastened to the outer vertical side of the Ц-shaped electrically conductive tab 10. A wiring clip can be clamped only by firstly wedging into a gap defined between the vertical side of the resilient tab 11 and the inner sidewall of the electrically conductive tab 10 via a wedge-shaped tool so as to form a snap opening there between, then introducing the wiring terminal into the snap opening, and finally withdrawing the wedge-shaped tool. The back end of the electrically conductive tab 10 is embedded into an embedding slot 3a of the wiring socket. A resilient pressing tab 13 is supported between the inner wall of the wiring socket 3 and the electrically conductive tab 10 for further improving reliability. Double rows of dual columns of inserting holes 10a are defined at central portion of the electrically conductive tab 10 provided on a central wiring socket for receiving the pins of a diode, and a single row of dual columns of inserting holes 10a are defined at central portion of the electrically conductive tabs 10 provided on two lateral located wiring sockets for receiving the pins of a diode, as shown in FIGS. 9a and 9b. Two diodes 8 are received between electrically conductive tabs 10 of adjacent wiring sockets in parallel to increase current intensity which can be doubled in theory. Correspondingly, two snap holes 7e for contacting pins of a diode are formed on central sidewall 7a of the heat sink metal fin 7 by stamping process. Inserting hole 10a at the central portion of the electrically conductive tab 10 is of a rectangular shape. The inserting hole 10a has inserting pins 10b disposed at both sides thereof for inserting into corresponding mounting holes 3b of the wiring socket, as shown in FIGS. 9a-9b, 3 and 6. A rectangular inserting hole 12a and a resilient snap pin 12b are formed on a metal snap tab 12 with a snap side 12c. In this embodiment of the invention, the vertical side of the metal snap tab 12 has a snap hole defined therein for securing pins of a diode, as shown in FIGS. 10a and 10b. The resilient snap pin 12b engages the inserting pin 10b of the electrically conductive tab to form a snap opening for clamping the pins of a diode. The electrically conductive tab 10 has a resilient inserting opening 10c formed on its front portion for receiving and connecting an inserting head of a plug component. In normal cases, this kind of resilient inserting opening 10c takes the form of a sleeve with slits defined therein, as shown in FIG. 9b. The front end of the electrically conductive tab 10 has a metal socket 14 press-fitted thereto, and a through hole 14a is provided in the metal socket 14 for insertion of the inserting head of the plug component. A press-fitting screw 14b is connected to the metal socket 14 at the top portion thereof. The metal socket 14 is embedded and secured in a receiving hole 3c of the wiring socket, thereby greatly enhancing plug connection reliability by using the metal socket along with the press-fitting screw, as illustrated in FIGS. 1 and 3.

Figure 4:
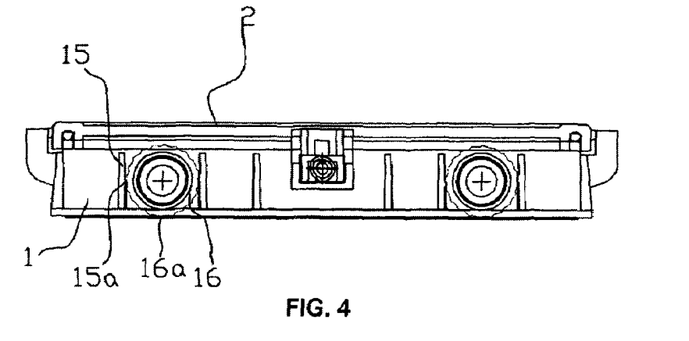
FIG. 4 is a front view of the fast terminal box.

After the cover 2 and the casing 1 are adjoined and aligned with each other, they can be connected together rapidly by engagement between the snap pin 2a and the snap socket 1a at both sides. A snap tab 15 is disposed at both sides of the casing 1 adjacent the wiring terminal portion. The snap tab 15 has a snap pin 15a provided thereon. Pairs of the snap tabs 15 are disposed at both sides of the wiring terminal. Correspondingly, a nut 16 of the wiring terminal has plural snap teeth 16a engaging the snap pin 15a formed around its perimeter, as seen in FIGS. 1 and 4.

Of course, instead of classed into electrically conductive tab of the central portion and that of the both sides, all the electrically conductive tabs 10 of the wiring socket define two rows of dual columns of inserting holes 10a at the central portion thereof for receiving pins of the diode 8. Plural diodes 8 are connected between electrically conductive tabs 10 of adjacent wiring sockets in parallel. Correspondingly, two snap holes 7e for contacting pins of a diode 8 are formed on central sidewall of the heat sink metal fin 7 by stamping process, the principle of which is similar to the aforementioned embodiment. That is, some of inserting holes of the metal connection tab formed at two sides of the wiring socket are not to be used, thereby resulting in material waste and increasing volume of the terminal box.

The principle is as follows: during operation, the diode 8 and the metal connection component 4 both produce heat which is conducted through the connection portion to the heat sink metal fin 7 continuously. The heat is radiated into ambient air via the covering structure and at the same time, as diodes 8 are connected in parallel and in a form of two circuits, resistance of the circuits is further decreased, thereby further reducing heat generation, and enabling the terminal box to be suited to environment where currents of large amplitude are used.

EMBODIMENT 2

Figure 12A:
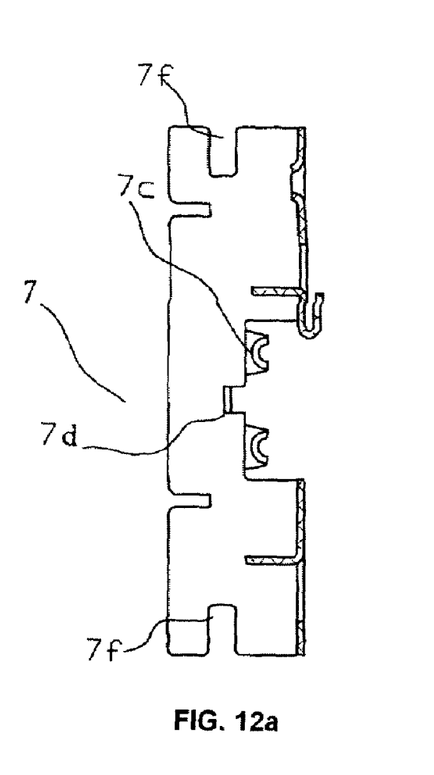
FIG. 12a shows a side view of a heat sink metal fin of another structure.
Figure 12B:
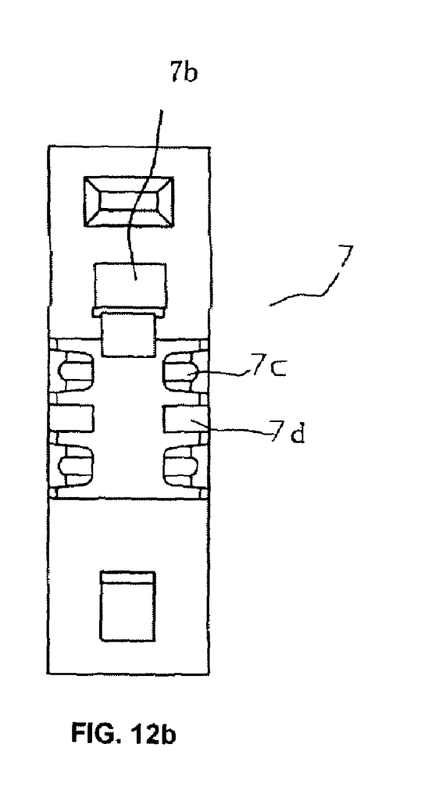
FIG. 12b shows a top plan view of the heat sink metal fin of another structure.
Figure 13:
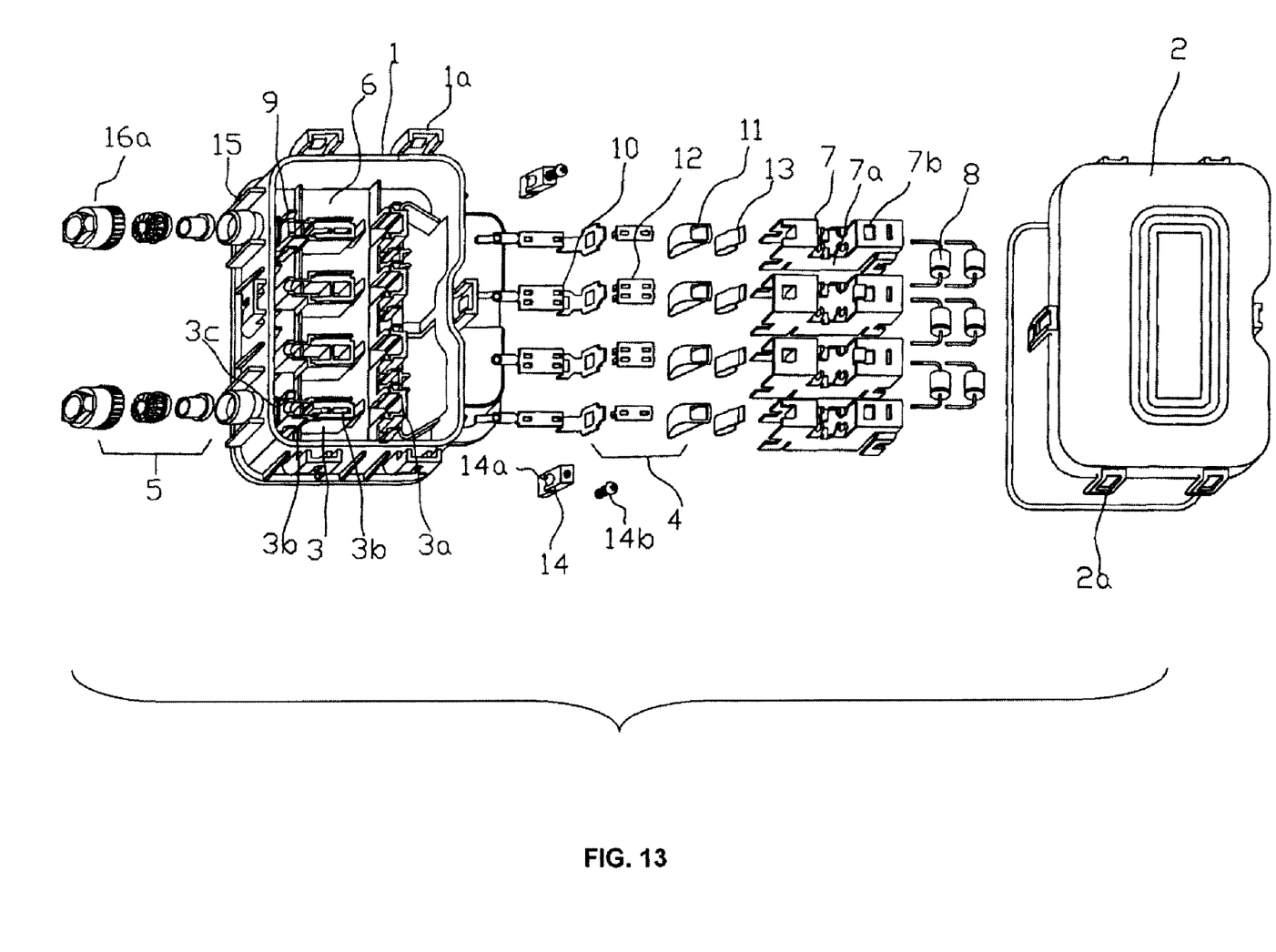
FIG. 13 shows an exploded perspective view of a heat sink metal fin of another structure of the terminal box.

As shown in FIGS. 12a-12b and 13, a critical feature of the invention is: plural heat sink metal fins made of copper or aluminum 7 are contained in a space around the wiring socket 3. Wiring apertures 7b and inserting holes for insertion of a tool therein are defined in a surface of the heat sink metal fins 7 respectively. The heat sink metal fins 7 take the form of covering structure, in which the cross section of a main body is shown as an inverted Ц. As illustrated in FIG. 12a and FIG. 12b, A first connection tabs 7c for contacting the pins of the diode 8 are formed at the sidewalls 7a of the heat sink metal fins 7 at the central portion thereof by stamping process. A second connection tabs 7d for contacting the metal connection components are also formed at the sidewalls 7a of the heat sink metal fins 7 at the central portion thereof by stamping process for transferring heat generated by the metal connection component and the diodes to the heat sink metal fins, thereby obtaining better heat transfer and dissipation effect than the first embodiment. The first connection tabs 7c are arc-shaped so as to locate the pins of a diode 8 therein. In addition, the pins of the diode 8 are connected to the first connection tabs 7c by welding process, thereby improving heat conduct performance and further enhancing connection reliability.

Snap openings 7f are defined at four corners of a sidewall of the heat sink metal fin 7. Correspondingly, resilient snap pins 9 are disposed at four corners of the both sides of a sidewall of the wiring socket 3 such that the heat sink metal fin 7 is mounted around the wiring socket 3 by snap-fitting engagement.

Figure 14:
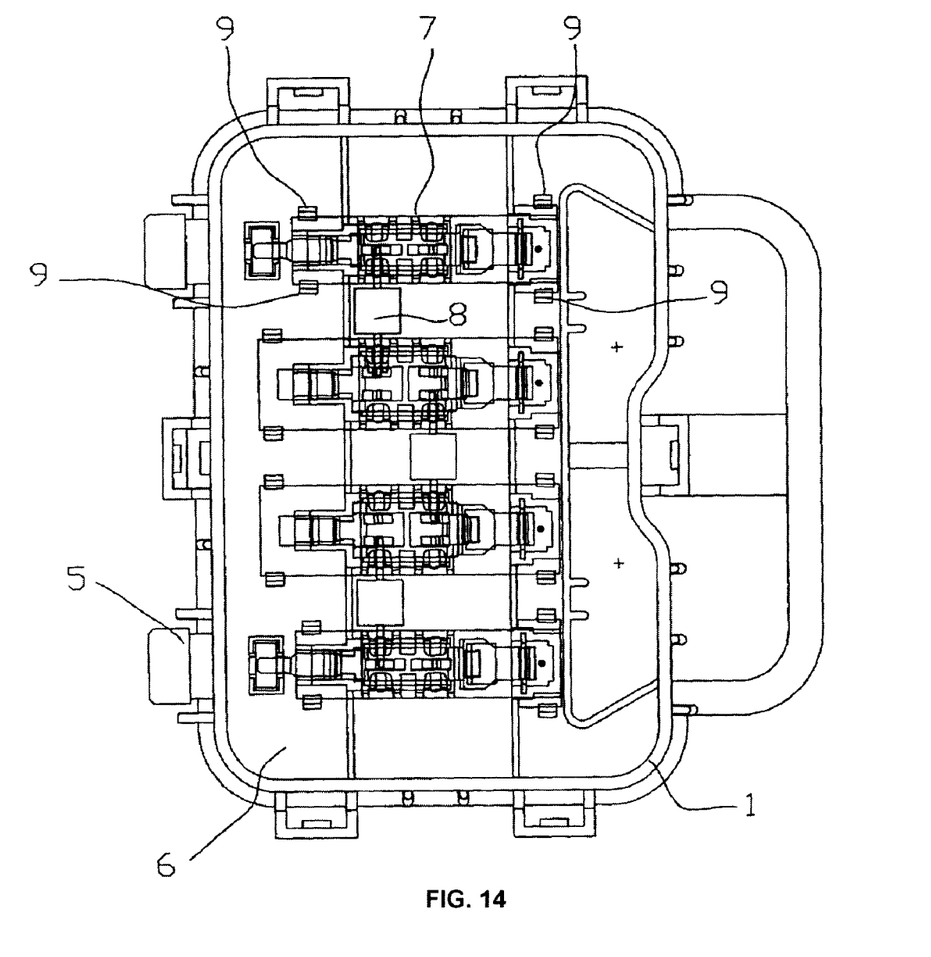
FIG. 14 shows top plan view of a heat sink metal fin of another structure of the terminal box (in perspective)
Figure 15:
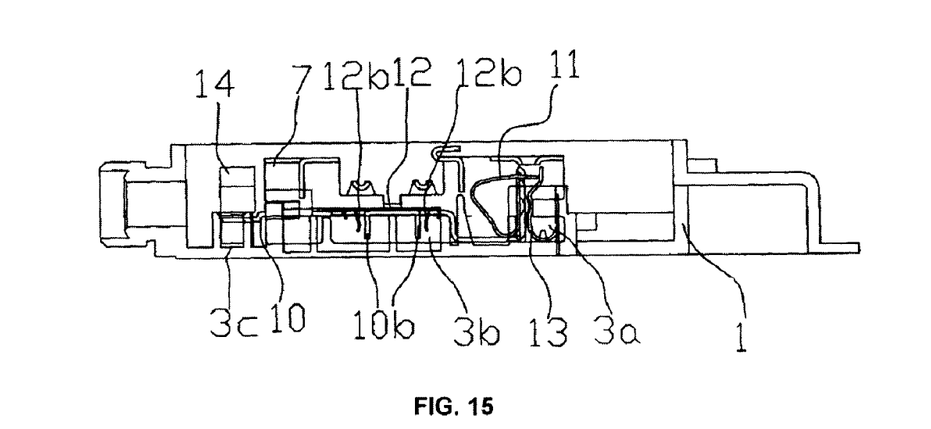
FIG. 15 shows a side view of a fast terminal box of another structure.
Figure 16A:
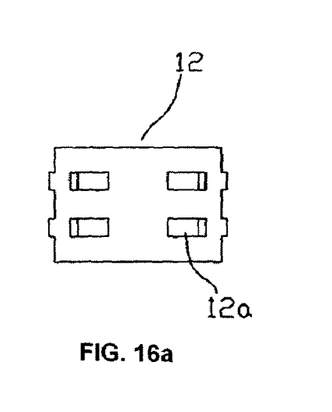
FIG. 16a shows a top plan view of a metal snap tab.
Figure 16B:
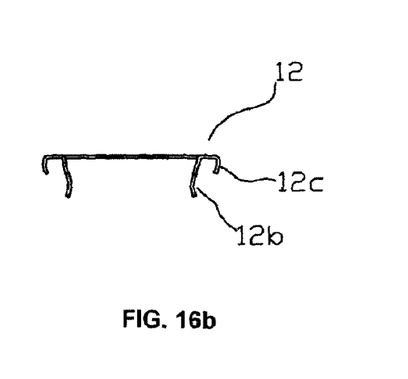
FIG. 16b shows a side view of the metal snap tab.
Figure 17:
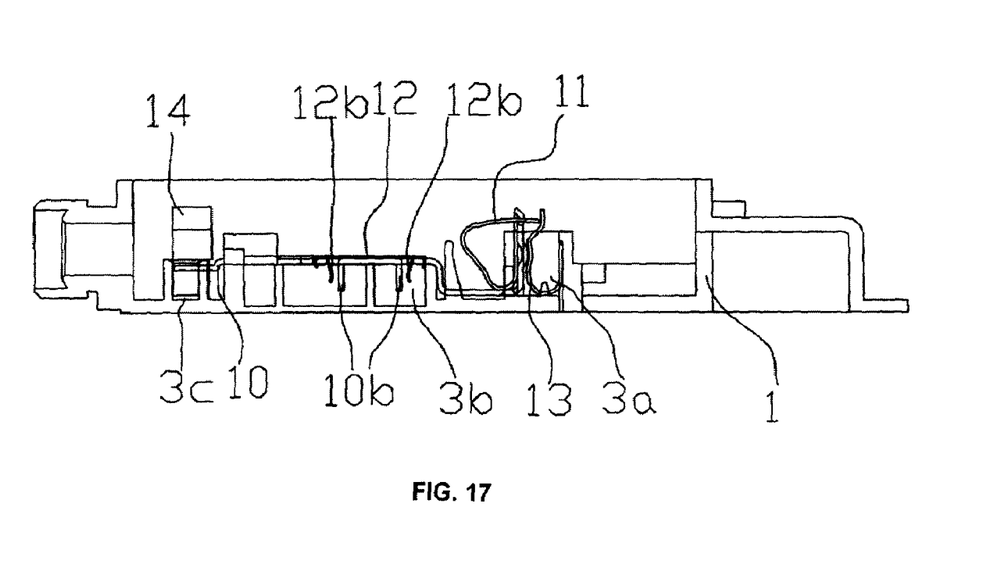
FIG. 17 shows a side view of a fast terminal box of another structure (with a plug portion removed).

As a further improvement, as seen in FIGS. 13-15, in embodiments of the invention, in addition to electrically conductive tabs 10, the metal connection component 4 further comprises a resilient metal tab 11 and a metal snap tab 12. Back portion of the electrically conductive tab 10 has a Ц-shaped cross section, an inwardly recessed portion of which is fixedly connected with a substantially σ-shaped resilient tab 11. A vertical side of the resilient tab 11 is pressed against an Ц-shaped inner surface of the electrically conductive tab 10. A rectangular hole 11a is defined at a free end of the resilient tab 11 that extends from the resilient tab 11. The front end of the rectangular hole 11a is snapped and fastened to the outer vertical side of the Ц-shaped electrically conductive tab 10. A wiring clip can be clamped only by firstly wedging into a gap defined between the vertical side of the resilient tab 11 and the inner sidewall of the electrically conductive tab 10 via a wedge-shaped tool so as to form a snap opening there between, then introducing the wiring terminal into the snap opening, and finally withdrawing the wedge-shaped tool. The back end of the electrically conductive tab 10 is embedded into an embedding slot 3a of the wiring socket. A resilient pressing tab 13 is supported between the inner wall of the wiring socket 3 and the electrically conductive tab 10 for further improving reliability. Double rows of dual columns of inserting holes 10a are defined at central portion of the electrically conductive tab 10 provided on a central wiring socket for receiving the pins of a diode, and a single row of dual columns of inserting holes 10a are defined at central portion of the electrically conductive tabs 10 provided on two lateral located wiring sockets for receiving the pins of a diode, as shown in FIG. 13. Two diodes 8 are received between adjacent electrically conductive tabs 10 of the wiring socket in parallel to increase current intensity which can be doubled in theory. Correspondingly, two snap tabs 7c for contacting pins of a diode are formed on central sidewall 7a of the heat sink metal fin 7 by stamping process. Inserting hole 10a at the central portion of the electrically conductive tab 10 is of a rectangular shape. The inserting hole 10a has inserting pins 10b disposed at both sides thereof for inserting into corresponding mounting holes 3b of the wiring socket, as shown in FIG. 15. A rectangular inserting hole 12a and a resilient snap pin 12b are formed on a metal snap tab 12 with a snap side 12c. The resilient snap pin 12b engages the inserting pins 10b of the electrically conductive tab for securing pins of a diode as shown in FIGS. 15-16. The electrically conductive tab 10 has a resilient inserting opening 10c formed on its front portion for receiving and connecting an inserting head of a plug component. In normal cases, this kind of resilient inserting opening 10c takes the form of a sleeve with slits defined therein, as shown in FIGS. 9a-9b. The front end of the electrically conductive tab 10 has a metal socket 14 press-fitted thereto, and a through hole 14a is provided in the metal socket 14 for insertion of the inserting head of the plug component. A press-fitting screw 14b is connected to the metal socket 14 at the top portion thereof. The metal socket 14 is embedded and secured in a receiving hole 3c of the wiring socket, thereby greatly enhancing plug connection reliability by using the metal socket along with the press-fitting screw, as illustrated in FIG. 13.

Of course, instead of classed into electrically conductive tab of the central portion and that of the both sides, all the electrically conductive tabs 10 of the wiring socket define two rows of dual columns of inserting holes 10a at the central portion thereof for receiving pins of the diode 8. Plural diodes 8 are connected between adjacent electrically conductive tabs 10 of the wiring socket in parallel. Correspondingly, two first connection tabs (7c) for contacting pins of a diode are formed on central sidewall of the heat sink metal fin 7 by stamping process, the principle of which is similar to the aforementioned embodiment. That is, some of inserting holes of the metal connection tab formed at two sides of the wiring socket are not to be used, thereby resulting in material waste and increasing volume of the terminal box.

The principle is as follows: during operation, the diode 8 and the metal connection component 4 both produce heat which is conducted through the connection portion to the heat sink metal fin 7 continuously. The heat is radiated into ambient air via the covering structure and at the same time, as diodes 8 are connected in parallel and in a form of two circuits, resistance of the circuits is further decreased, thereby further reducing heat generation, and enabling the terminal box to be suited to environment where currents of large amplitude are used.

What is claimed is:

1. A fast terminal box comprising a casing, a cover, a plurality of wiring sockets, a plurality of metal connection components and a plurality of wiring terminals; wherein the wiring sockets are placed and distributed on a bottom plate of the casing one by one; one of the metal connection components is provided on each of the wiring sockets for connection purpose; the casing and the cover are combined to each other; and the wiring terminals are distributed at a sidewall of the casing for receiving corresponding wiring plugs therein; characterized in that: one of heat sink metal fins is contained in a space around each of the wiring sockets, and the heat sink metal fins contact pins of a diode and the metal connection component respectively through corresponding connection portions thereof; and one or more wiring apertures are defined in an outer surface of the heat sink metal fins.

2. The fast terminal box according to claim 1, wherein each of the heat sink metal fins takes the form of a covering structure, the cross section of a main body of each of the heat sink metal fins is of an inverted "Ц"shape; and on sidewalls of each of the heat sink metal fins there are a first plurality of connection tabs or snap holes for contacting the pins of the diode and a second plurality of connection tabs for contacting a metal connection component.

3. The fast terminal box according to claim 2, wherein resilient snap pins are positioned at two sides of each of the wiring sockets and corresponding snap openings are defined on sidewalls of each of the heat sink metal fins and each of the heat sink metal fins (7) is mounted around one of the wiring sockets via snap-fitting engagement.

4. The fast terminal box according to claim 3, wherein there is a row of wiring sockets including a wring socket at each end of the row and a plurality of wring sockets in the middle of the row, each of the wiring sockets in the middle is embedded with a metal connection component having an electrically conductive tab with multiple rows of dual columns of inserting holes defined at central portion thereof for receiving the pins of a plurality of diodes, the wiring socket at each end is embedded with a metal connection component having an electrically conductive tab with a single row of dual columns of inserting holes defined at central portion thereof for receiving the pins of a diode, several diodes are received in parallel between adjacent electrically conductive tabs in the wiring sockets, and for each pin of the diodes received there is a first connect tab or snap hole defined on the sidewall of the heat sink metal fin.

5. The fast terminal box according to claim 3, wherein the metal connection component includes an electrically conductive tab embedded into the wiring socket; multiple rows of dual columns of inserting holes are defined at central portion of the electrically conductive tab for receiving the pins of a diode; several diodes are received in parallel between adjacent electrically conductive tabs in the wiring socket; and a number of first connection tabs or snap holes are formed in sidewalls of the heat sink metal fin at central portion thereof.

6. The fast terminal box according to claims 4, wherein the first connection tabs each are arc-shaped.

7. The fast terminal box according to claim 6, wherein there is a 2×2 matrix of the receiving holes in each of the electrically conductive tabs for receiving pins of a diode therein.

8. The fast terminal box according to claim 7, further comprising a resilient metal tab and a metal snap tab; wherein back portion of the electrically conductive tab has a "Ц"-shaped cross section, an inwardly recessed portion of which is fixedly connected with the resilient metal tab:

and the metal snap tab has a resilient snap pin which engages the inserting pin of the electrically conductive tab in order to secure the pins of a diode.

9. The fast terminal box according to claim 8, wherein the casing has a snap tab disposed at its side surface adjacent to a wiring terminal; a snap pin is provided on the snap tab and accordingly, a snap engagement is formed between the snap pin snap teeth around the perimeter of a nut surface of the wiring terminal.

10. The fast terminal box according to claim 9, wherein pairs of snap tabs are disposed at both sides of the wiring terminal.

11. The fast terminal box according to claims 5, wherein the first connection tabs each are arc-shaped.

12. The fast terminal box according to claim 11, wherein there is a 2×2 matrix of the receiving holes in each of the electrically conductive tabs for receiving pins of a diode therein.

13. The fast terminal box according to claim 12, further comprising a resilient metal tab (11) and a metal snap tab (12); wherein back portion of the electrically conductive tab has a "Ц"-shaped cross section, which has an inwardly recessed portion fixedly connected with the resilient metal tab:

and the metal snap tab has a resilient snap pin which engages the inserting pin of the electrically conductive tab in order to secure the pins of a diode.

14. The fast terminal box according to claim 13, wherein the casing has a snap tab disposed at its side surface adjacent to a wiring terminal; a snap pin is provided on the snap tab and accordingly, a snap engagement is formed between the snap pin snap teeth around the perimeter of a nut surface of the wiring terminal.

15. The fast terminal box according to claim 14, wherein pairs of snap tabs are disposed at both sides of the wiring terminal.

16. The fast terminal box according to claim 2, wherein the pins of the diode and the first plurality of connection tabs are connected via welding.

* * * * *